No. 743,013. PATENTED NOV. 3, 1903.
L. MOTT.
AUTOMOBILE STEERING MECHANISM.
APPLICATION FILED NOV. 24, 1902.
NO MODEL.
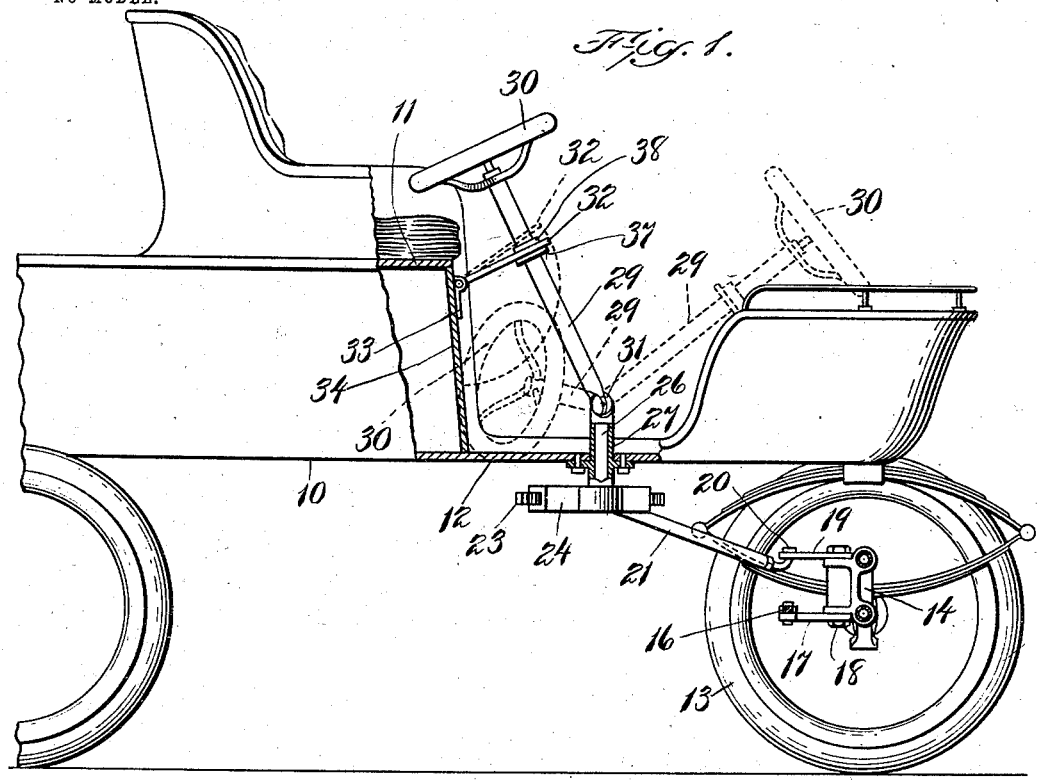
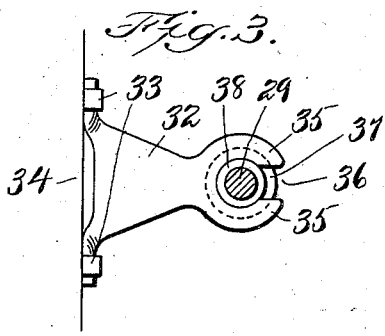
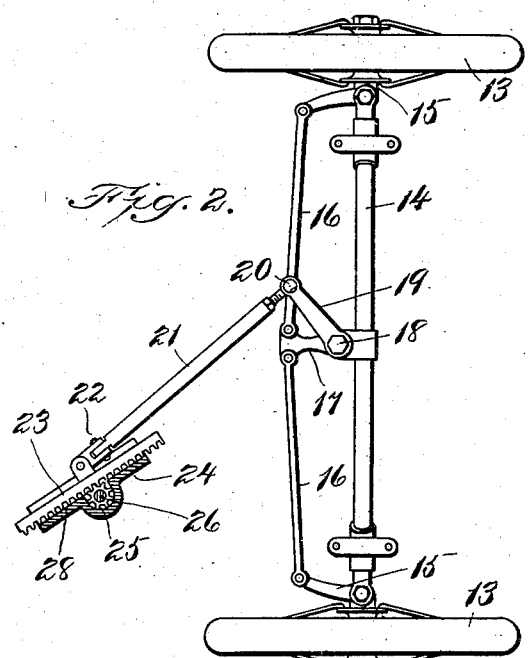
Witnesses:
Adeline C. Ratigan
E. Batchelder
Inventor:
Laurence Mott
By Wright, Brown & Quinby
Attys No. 743,013.

Patented November 3, 1903.

UNITED STATES PATENT OFFICE.

LAURENCE MOTT, OF NEW YORK, N. Y.

AUTOMOBILE STEERING MECHANISM.

SPECIFICATION forming part of Letters Patent No. 743,013, dated November 3, 1903.

Application filed November 24, 1902. Serial No. 132,576. (No model.)

*To all whom it may concern:*

Be it known that I, LAURENCE MOTT, of New York, in the county of New York and State of New York, have invented certain new and useful Improvements in Automobile Steering Mechanisms, of which the following is a specification.

This invention relates to steering mechanisms for automobiles, and more particularly to the class known as "wheel-steerers," characterized usually by a post proceeding upwardly from the floor of the vehicle and having a wheel at the upper end to be grasped by the operator. The wheel, however, is not a necessity, as a single handle-arm is sometimes employed.

One object of the present invention is to enable the steering-pillar to be swung about to various positions both for the purpose of enabling the steersman to enter and leave his seat conveniently and also to afford an opportunity for a person seated at one side of the steerman's seat or even standing out in the road, as is sometimes done in climbing a steep hill to decrease weight, to steer the vehicle. To this end I employ a steering-pillar whose upper section is mounted for universal swinging movement on the lower section, together with suitable novel means for supporting this swinging pillar in a normal rigid position.

Another object of the invention is to render the steering connections practically non-reversible by irregularities in the road, and for this purpose I provide a certain novel construction of rack-and-pinion mechanism, as hereinafter described and claimed. It will be understood, however, that the invention is not wholly confined to the steering of the vehicle, as other parts of the vehicle-controlling mechanism may be operated on the principle herein disclosed.

Of the accompanying drawings, Figure 1 represents a side elevation, partly in section, of an automobile steering mechanism embodying my invention. Fig. 2 represents a plan view thereof, partly in horizontal section. Fig. 3 represents a cross-section of the steering-pillar, showing the supporting-bracket in plan.

The same reference characters indicate the same parts in all the figures.

In the drawings, 10 represents the vehicle-body, having a seat 11 and the floor or foot-rest 12 in front of the seat.

13 13 are the steering-wheels, pivoted to the cross-frame 14 and having their knuckles 15 15 connected in a well-known manner by rods 16 16 with an arm 17, attached to a spindle 18, which is journaled vertically on the cross-frame 14. At the upper end of said spindle is fixed an arm 19. The latter has a universal pivotal connection at 20 with a rod or link 21, which in turn has a universal pivotal connection at 22 with the back of a rack 23, mounted in a rack-guide 24, attached to the floor of the vehicle. The body 10, as usual, is spring-supported on the cross-frame or axle structure 14, as indicated, so as to yield vertically with respect thereto, which yielding movement is permitted by the pivotal joints at the ends of the link 21. The teeth of the rack engage those of a gear-pinion 25, attached to the lower section 26 of the steering-pillar, which is journaled vertically in a sleeve-bearing 27, projecting up through the floor 12. I have found it practicable to make the rack-and-pinion mechanism substantially non-reversible under strains transmitted from the steering-wheels and yet capable of being freely operated by the rotation of the steering-pillar. Non-reversibility is aided by employing a small pinion, against which the rack operates with a mechanical disadvantage; but the effect is further secured as follows: It will be noted that the tooth-crests of the rack are in sliding engagement with the guiding-surface 28, extending on opposite sides of the pinion 24, and also that the link 21 is attached to the back of the rack about midway between the ends of the latter and extends toward the arm 19 at a slight angle to the rack. The reversing strains transmitted through the link 21 thus tend to force the toothed surface of the rack against the bearing-surface 28, and as the teeth of the rack constitute an exaggerated roughened surface on the rack considerable friction is exerted thereby against the rack-guide, which tends to obstruct the sliding movement of the rack; but when the pinion 25 is rotated by the operation of the steering-pillar its natural unmeshing or radial thrust on the rack 23 relieves the friction of the rack-teeth on the guide and the rack is allowed to move freely. This lateral thrust is exerted very nearly uniformly throughout the rack, because of the fact that it is resisted at about the middle point of the rack by the connection of the link 21 at said point. Connecting the link at this point of the rack avoids cramping of the rack in its guide when operated by the steering-pillar.

29 represents the upper section of the steering-pillar, having the hand-wheel 30 at its upper end and connected by a universal joint 31 with the lower section 26. This joint transmits the rotary movements of the upper section 29 to the lower section 26 in a great variety of angular positions of the upper section in different planes. By reason of this universal movement the pillar-section 29 may be thrown forward, as represented by the right-hand dotted-line position in Fig. 1, to give easy ingress to and egress from the operator's seat, and steering may also be effected from various points other than the operator's part of the vehicle-seat.

It being desirable normally to hold the swinging pillar-section 29 in a rigid position, so as to be operated after the manner of an ordinary rigid pillar, I may hinge a supporting-bracket to a convenient stationary support and have shown such a bracket 32 hinged at 33 to the front or upright part 34 of the seat structure, just below the operator's seat. This bracket swings in a vertical plane, so as to project out into supporting position or fold down against the support 34 out of the way, and such vertical movement is also utilized to couple the bracket to and uncouple it from the pillar-section 29.

The coupling whereby the bracket supports the pillar-section against universal movement is formed by forking the end of the bracket at 35 35, with a recess 36 between the arms of the fork to admit the pillar-section 29. The end of the bracket is supported by a flange 37 on the pillar-section, above which is a cylindrical shoulder 38 of smaller diameter than the flange, but larger than the body of the pillar-section 29. The slot 36 is narrower than the diameter of the shoulder 38, so that when the bracket is brought into engagement with the shoulder 38 by a downward swinging movement the pillar is prevented from moving out of engagement with the bracket in a forward direction. To release the pillar-section 29, the bracket 32 is lifted to the dotted-line position represented in Fig. 1 and the pillar-section thrown out in a forward direction. The bracket may then be swung down to its retracted position.

By journaling the lower pillar-section 26 vertically on the vehicle-body I attain several advantages, one of which is that said pillar-section and its bearing when thus positioned occupy less space in a horizontal direction than they would if mounted on a slant, and sufficient room is thereby allowed for other parts of the vehicle, such as tanks. Another advantage is that the vehicle can be steered when the upper pillar-section is swung forward of a vertical position, substantially as represented in Fig. 1, which would not be possible if the lower section 26 had any considerable backward rake with the ordinary form of universal joint, and a third advantage is that I am enabled to employ gearing working in a horizontal plane, and particularly the rack-and-pinion form of gearing, as shown, this being a very simple and inexpensive transmission and one not liable to excessive backlash.

I do not confine myself to the exact details of construction herein set forth, as various modifications may be made without departing from the spirit of the invention.

I claim—

1. In an automobile steering mechanism, the combination with a steering-wheel of the vehicle, of a rotatable steering-pillar having a lower section connected to said wheel, an upper or handle section connected for and capable of universal swinging movement on said lower section, and means having an adjustable holding coupling or connection with said upper section for supporting it against such movement.

2. In an automobile steering mechanism, the combination with a steering-wheel of the vehicle, of a rotatable steering-pillar having a lower section connected to said wheel, an upper or handle section connected for universal swinging movement on said lower section, a stationary support, and a bracket having a folding connection with said support and a separable coupling or connection with said upper section, for supporting the latter against such movement.

3. In an automobile steering mechanism, the combination with a steering-wheel of the vehicle, of a rotatable steering-pillar having a lower section connected to said wheel, an upper or handle section connected for universal swinging movement on said lower section, a stationary support, a bracket hinged for vertical swinging movement on said support and adapted to support said upper section against said universal movement, and means whereby such vertical swinging movement couples the bracket with and uncouples it from said upper section.

4. In an automobile steering mechanism, the combination with a steering-wheel frame and the vehicle-body, of a steering member mounted on said frame, a steering-pillar on the body provided with a gear-pinion, a rack-guide on the body, a rack mounted in said guide with its tooth-crests in sliding engagement with one of the guiding-surfaces, and a link pivoted to the back of said rack between the ends of the latter and extending at an angle with the rack to a pivotal connection with said frame-steering member.

5. In an automobile steering mechanism the combination of a steering-wheel frame, a steering-wheel pivoted thereto, a swinging arm pivoted on said frame and connected to turn said wheel, a vehicle-body yieldingly connected with said frame and having a seat, a lower rotary steering-pillar section journaled on the body in front of said seat and carrying a pinion, an upper rotary steering-pillar section movably connected with said lower section and capable of swinging movement toward and away from said seat, a sliding rack on the body meshing with said pinion, and a thrust-link pivotally connected with said rack and with said swinging arm.

6. In a controller for automobiles, the combination of a controlling-pillar operating by a rotary or twisting movement and having in addition a universal swinging movement, vehicle-controlling means operated thereby, and means having an adjustable holding coupling or connection with said pillar for supporting it against such universal movement.

In testimony whereof I have affixed my signature in presence of two witnesses.

LAURENCE MOTT.

Witnesses:
R. M. PIERSON,
ADELINE C. RATIGAN.